United States Patent
Webb

[11] 3,976,388
[45] Aug. 24, 1976

[54] CONDUIT DEBURRING TOOL

[76] Inventor: George E. Webb, 2300 Lakeside Drive, Orlando, Fla. 32803

[22] Filed: Sept. 18, 1975

[21] Appl. No.: 614,500

[52] U.S. Cl. .................................. 408/211; 408/227
[51] Int. Cl.² ......................................... B23B 51/00
[58] Field of Search .......... 408/191, 201, 211, 212, 408/213; 51/205 R

[56] References Cited
UNITED STATES PATENTS

| | | | |
|---|---|---|---|
| 2,470,392 | 5/1949 | Gassman | 408/201 |
| 2,583,246 | 1/1952 | Williams | 408/211 |
| 3,168,799 | 2/1965 | Johnson | 51/205 R |
| 3,802,793 | 4/1974 | Simon | 408/211 X |
| 3,917,429 | 11/1975 | Ertley | 408/227 |

*Primary Examiner*—Othell M. Simpson
*Assistant Examiner*—W. R. Briggs
*Attorney, Agent, or Firm*—Macdonald J. Wiggins

[57] ABSTRACT

A hand tool for concurrently removing burrs from the inner edge and outer edge of the cut end of EMT conduit. The preferred embodiment of the tool consists of a tee-shaped body having a deburring element disposed at the end of each arm of the tee, permitting three sizes of conduit to be deburred. A deburring element consists of a generally conical projection from the body having a circular rim surrounding the base of the conical projection, with the axis of the rim coincident with the axis of the conical projection. The interior surface of the rim and the exterior surface of the conical projection acutely diverge with respect to the intersection of these surfaces. The intersection forms a circle having a diameter approximately equal to the mean diameter of the conduit to be deburred. The surfaces are serrated, forming cutting surfaces. In use, a cut conduit end is placed over the conical projection which serves to guide the end into contact with the serrated interior and exterior surfaces, and the tool is rotated with respect to the conduit, wherein deburring is quickly and easily accomplished. In using one deburring element, the other two elements and arms are utilized as a handle to grasp while operating the tool.

7 Claims, 7 Drawing Figures

CONDUIT DEBURRING TOOL

BACKGROUND OF THE INVENTION

1. Field of the Invention

My invention relates to hand tools for deburring the inner and outer edges of the cut end of a tube of the like.

2. Description of the Prior Art

In the use of EMT-type conduit for electrical wiring installation, the cutting of the tubing causes burrs or ridges to be formed at the cut end. Some electrical codes forbid the use of a roller-type tube cutter, and the electrician will generally utilize a hand hacksaw for cutting conduit to a required length. This technique causes formation of sharp burrs on both the inner and outer edges of the cut end. Such burrs must be removed to allow fitting of the conduit into couplings or other fittings, and to prevent damage to electrical wiring insulation that is subsequently pulled through the conduit.

The deburring operation is commonly performed by the electrician with makeshift means, such as using the handle of a pair of slipjoint-type pliers to ream the inner edge and the jaws of the pliers to clean the outer edge. While the prior art has provided specialized tools that can perform this operation more efficiently, these tools have been relatively complex and expensive. For example, F. R. Wilson in U.S. Pat. No. 3,232,145 teaches a hand reamer having the capability to deburr both inner and outer surfaces of the cut end of a tube. However, one surface at a time must be reamed or champfered, requiring two operations. A tool capable of concurrently reaming the inner edge of a cut tube and champfering the outer edge is described by R. V. Strybel in U.S. Pat. No. 3,870,432. This tool is relatively complicated, involving a plurality of cutter blades, springs for maintaining the blades engaged with the cut end of the tube, and interchangeable guides for various tube sizes.

SUMMARY OF THE INVENTION

My invention is directed to a hand tool of essentially one-piece construction and of low cost, for concurrently removing burrs from the inner edge of the cut end of a tube and from the outer edge thereof.

More specifically, one embodiment of my invention involves a deburring element consisting of a right cylindrical body having a set of inner and outer conical cutter surfaces at the outer end of the body and concentric therewith. The inner cutter surface is generally in the shape of a solid circular frustrum having a base diameter equal to the mean diameter of the conduit to be deburred and a top diameter equal to approximately one-half the base diameter. The conical cutter surfaces are serrated forming effecting deburring surfaces. As may be understood, the body, inner cutter surface, and outer surface form a solid, one-piece tool having no moving parts.

The cylindrical body inner end may have a handle or grip attached to be held in the hand of the user. In one mode of use, the cut conduit is held in one hand and the deburring tool in the other. The top of the inner cutter frustrum is inserted in the conduit end with its conical taper serving to self-center the conduit axis with the tool body axis. The cut end of the conduit is manually forced into contact, such that its outer edge is in contact with the outer cutter surface and its inner edge is in contact with the inner cutter surface. The tool is then rotated in a back-and-forth motion, causing the serrated cutting surfaces to shear off all burrs and to perform a slight reaming action on the inner conduit edge and to form a slight champfer on the outer conduit edge. It is significant to note that in accordance with my invention, the cutting surfaces cleanly remove burrs but do not have a pronounced cutting action that could dig into soft tubing or remove excessive metal.

In a preferred embodiment of my invention, I advantageously dispose three different-sized deburring elements in a tee-shaped configuration, such that the tool is easily held by the workman. As one element is in use, the other two arms of the tee serve as a convenient handle. Thus, as is now evident, the electrician is provided with a low-cost, simple tool that can very quickly deburr a cut conduit end with one operation, thereby increasing his efficiency and ensuring a uniform condition of all cut conduit.

Furthermore, the simplicity of construction allows my invention to be producible at a reasonable cost and to provide long life and high reliability.

It is therefore a primary object of my invention to provide a hand-operated deburring tool for electrical conduit and the like that allows removal of burrs on the inner and outer surfaces of the end of a conduit concurrently with one operation.

It is a further object to provide a deburring tool with no moving parts.

It is another object to provide a low-cost deburring tool that can easily be carried by a workman and that can be used without special skill or training.

It is yet another object to provide a deburring element that can be economically produced in several sizes and combined into a single, easily-handled tool.

It is still another object to provide a tool with three sizes of deburring elements in which any two of the elements form a handle for the other element.

It is still a further object to provide a deburring tool that is essentially self-aligning and does not require guides for conduit to be deburred.

It is yet a further object to provide a tool that will allow interior and exterior burrs on the cut end of a conduit or the like to be quickly removed without excessive cutting or damage to the conduit end and that is inherently safe for a workman to use and handle.

Other objects and advantages of my invention will be apparent from the detailed description hereinbelow.

DETAILED DESCRIPTION OF THE PREFERRED EMBODIMENT

Figure 1:
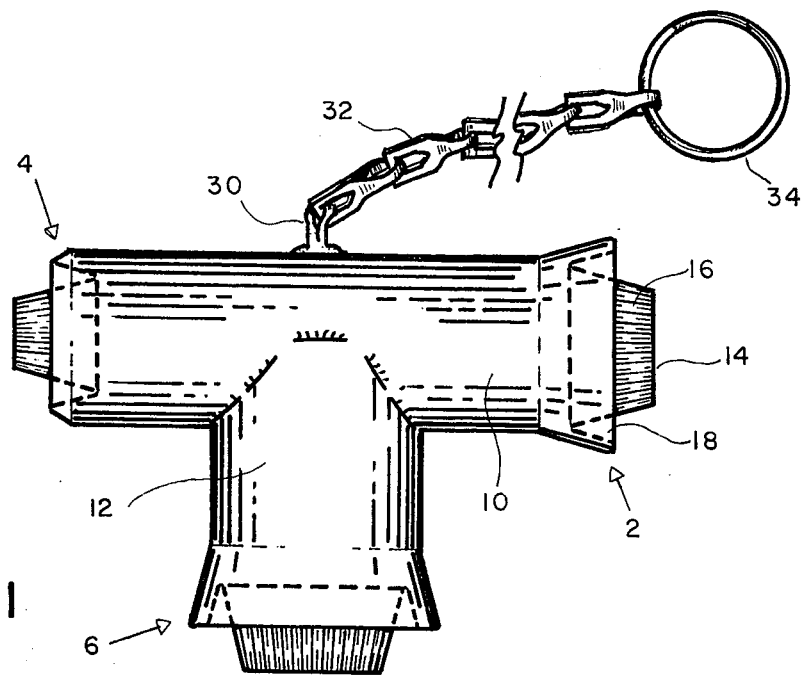
FIG. 1 is a side view of the preferred embodiment of my deburring tool in which three different sizes of deburring elements have been combined in a configuration that allows the unused elements to act as a handle for the tool.

FIG. 1 is a side view of the preferred embodiment of my deburring tool for thin-wall metallic electrical conduit (EMT) and the like. As depicted therein, a deburring element 2 for ¾-inch EMT conduit, a deburring element 4 for ½-inch EMT conduit, and a deburring element 6 for a 1-inch EMT conduit are combined in a tee-shaped configuration. Cylindrical body 10 has element 4 disposed at one end and element 2 at the opposite end. Cylindrical body 12 has element 6 attached to one end and the opposite end is affixed to the center of body 10. As will be described in more detail hereinbelow, the deburring elements 2, 4, and 6 are of similar construction, differing basically in size. Turning to deburring element 2 as typical, body 10 has a projecting portion 14 of generally conical shape. I prefer that the conical portion be truncated as shown. The resulting projecting frustrum 14 is surrounded at its base by circular rim 18 (best seen in FIG. 2). Circular rim 18 is concentric with frustrum 14, with the axis of frustrum 14 preferably coincident with the axis of body 10 to simplify manufacture.

Figure 2:
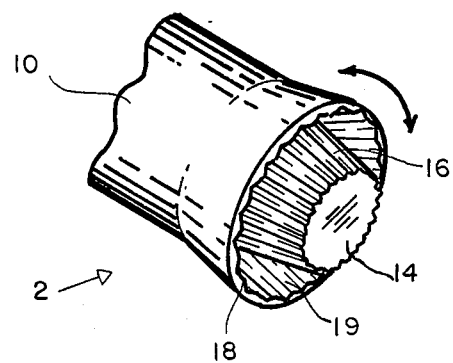
FIG. 2 is a perspective view of a deburring element in accordance with my invention.

The surface of frustrum 14 has serrations 16 cut therein and rim 18 has matching serrations (shown in FIG. 2). These serrations form cutting edges capable of removing burrs from the cut end of conduits. Deburring elements 4 and 6 are constructed in a like manner, but differ in size.

The deburring elements and associated bodies may be forged or machined from solid steel stock and the tee-shaped form configured by welding. If an easily-worked grade of steel is used, the cutting surfaces may be hardened by a conventional carbo-nitride or similar process. Alternatively, a deburring element may be fabricated with a very short body, the tee-shaped section constructed from steel tubing, plastic, or other suitable material, and the deburring elements attached to the tee-shaped section. Such alternative constructions can result in reduced weight and lower raw material costs and is to be considered within the scope of my invention.

As shown in FIG. 1, I attach a light chain 32 to the tool by means of eye 30. The other end of chain 32 has a ring 34 attached that may be utilized for attaching the tool to the workman's belt or tool pouch to provide quick access to the tool.

Turning now to FIG. 2, the construction of deburring element 2 can be more clearly seen. The outside diameter of cylindrical body 10 may be one inch to accommodate a ¾-inch inside diameter EMT conduit. The inner cutter frustrum 14 is concentric with body 10, and tapers from a top diameter of ½-inch to a base diameter equal to the mean diameter of the ¾-inch EMT conduit. The outer cutter rim 18 tapers outward from the body and the base of frustrum 14. The depth of the V-shaped annular cap thus formed by the conjunction of the exterior surface of frustrum 14 and the interior surface of rim 18 is selected so that the angle of the interior surface of rim 18 with the axis of body 10 is equal and opposite to that of the side surface of frustrum 14 with an included angle of 30° being preferred.

Serrations 16 may take the form of a plurality of V-shaped grooves cut into the exterior surface of frustrum 14, extending from the top end to the base and in line with the frustrum axis. A matching set of grooves cut into the interior surface of rim 18 forms serrations 19. The serrations 16 in the surface of frustrum 14 form cutting edges for deburring the inner edge of the cut end of a conduit and serrations 19 in the surface of rim 18 form cutting edges for deburring the outer edge of the cut end of a conduit. The number of grooves required is not critical. I have determined that 25 to 30 grooves provide good cutting efficiency.

Figure 3:
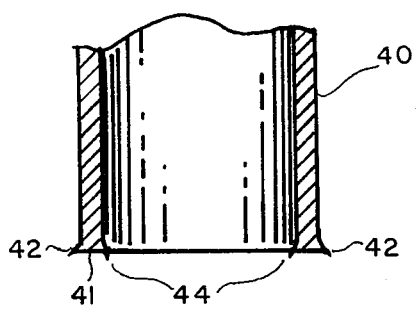
FIG. 3 is a cross-sectional view of a conduit to be deburred.
Figure 4:
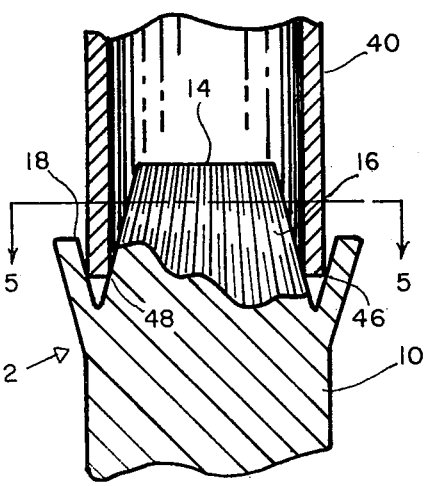
FIG. 4 is a view of the conduit of FIG. 3 in contact with a fragmentary section of a deburring element.

FIG. 3 shows a fragmentary cross-sectional view of a typical ¾-inch conduit having a cut end 41. The cutting operation is assumed to have created inner edge burrs 44 and outer edge burrs 42. FIG. 4 represents a fragmentary cross-sectional view of deburring element 2 with conduit 40 in position for deburring. As can be seen, the outer burrs 42 contact serrations 19 (not shown) as at point 46, and inner burrs 44 contact serrations 16 as at point 48. As the end of conduit 40 is manually placed over cutter frustrum 14, a guiding and self-centering action advantageously occurs, resulting in even contact of the inner and outer edges of conduit 40 with the cutting area formed by the surfaces of frustrum 14 and rim 18.

To use this embodiment of my invention, the workman selects the required cutting element as determined from the conduit size to be deburred, and then grasps the tool so as to expose that element. It is to be noted that advantageously the unused elements and their bodies serve as a handle to provide leverage as the tool is used. Assuming, for example, that element 2 is to be used, the workman inserts the inner cutter frustrum 14 into the inner end of the conduit, seating the conduit end against the inner and outer serrated surfaces 16 and 19. The conduit may be held in the other hand, in a vise, or by other means. The tool is rotated back and forth, holding the cutting element firmly againt the conduit end. The cutting surfaces 16 and 19 thereupon cleanly remove burrs, chips, or ridges from both inner and outer edges of the conduit ends concurrently. It is to be noted that the cutting edges are effective when rotated in either direction. The deburring action by virtue of my novel cutting surface design will not cause undesirable nicking or gouging of relatively soft EMT conduit.

Figure 5:
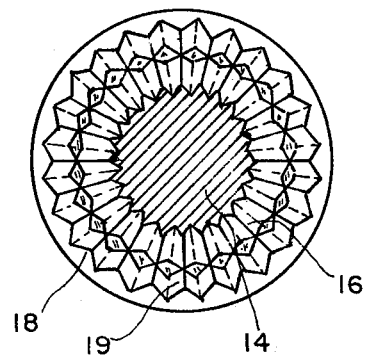
FIG. 5 is a sectional view of the deburring element taken on line 5—5 of FIG. 4.
Figure 6A:
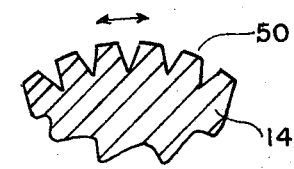
FIG. 6a is a fragmentary cross-section of the deburring tool frustrum showing an alternative cutting edge design.

Further details of the serrations or cutting edges generated by the grooves may be seen with reference to FIG. 5 in which section 5—5 of FIG. 4 is shown. As previously described, longitudinal V-grooves or serrations 16 are cut into the surface of frustrum 14. The intersection of adjacent grooves form the effective cutting edges. Matching V-grooves or serrations 19 are cut into the rim 18 extending radially to the outside periphery of rim 18, forming similar cutting edges. While it is not necessary for the operation of my deburring element, I prefer that serrations 19 match serrations 16 to simplify manufacture. Several alternative configurations of the cutting edges will be obvious to those skilled in the art. For example, FIG. 6a illustrates an easily-formed and effective edge configuration, in the form of a trapezoidal-shaped tooth 50. This form of cutting edge not only cleanly removes sharp burrs from the conduit, but the peripheral flat surfaces provide a burnishing action, resulting in a smooth conduit edge.

Figure 6B:
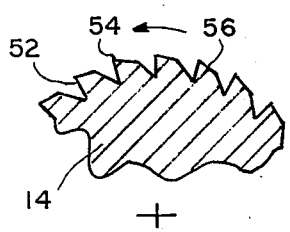
FIG. 6b is a fragmentary cross-section of the deburring tool frustrum showing an alternative cutting edge design for hard metal tubes.

As previously stated, a major application of my novel deburring tool is the deburring of relatively soft EMT conduit after cutting with a hacksaw. However, my invention is also applicable to other types of tubes and pipes that may be formed from harder materials. In such cases, the cutting surface may be formed with cutting edges similar to that of a milling cutter as shown in FIG. 6b. In this design, cutter surface 52 is normal to the circumference of a tube, edge 54 is the cutting edge, and surface 56 forms a relieved rake. It should be noted that effective cutting action with this design occurs only for relative rotation in the direction shown by the arrow. This design is especially effective for applications in which severe reaming and champfering is required.

As may now be recognized, the preferred embodiment of my invention provides the electrician with a simple, low-cost, and effective hand tool that allows him to quickly and efficiently remove burrs concurrently from the inner edge and outer edge of the cut end of EMT tubing in one simple operation.

While the preferred embodiment of my invention has been illustrated and described, it is to be understood that the construction thereof can be changed without departing from the spirit of my invention.

I claim:

1. A tool for concurrently deburring the inner and outer edges of the end of a tube or the like, comprising:
    a body having at least one projecting portion, said projecting portion being generally conical and symmetrically disposed about a central axis, said projecting portion extending outward from said body and having a generally circular smaller end at its outermost extremity with the diameter of said end substantially smaller than the inside diameter of the tube to be deburred; and
    a circular rim surrounding the base of said conical projecting portion and symmetrically disposed about said central axis, said rim having a generally conical interior surface intersecting with the exterior surface of said conical projecting portion, said exterior conical surface of said projecting portion and said interior surface of said rim diverging with respect to said intersection of said surfaces, said intersection forming a circle having a diameter essentially equal to the mean diameter of the tube to be deburred, said exterior conical surface having a length greater than the length of said interior conical surface whereby said conical projecting portion projects outward with respect to said rim,
    said interior conical surface and said exterior conical surface forming a tube-end contacting area, said surfaces being serrated;
    whereby said conical projecting portion serves to guide the end of a tube into contact with said contacting area and to safely maintain such contact, and whereby relative rotation of said area with respect to a tube end in contact with said area causes the inner and outer edges thereof to be concurrently deburred.

2. The tool as defined in claim 1 in which:
    said body is essentially a right cylinder; and
    said central axis is coincident with the axis of said cylinder.

3. The tool as defined in claim 2 in which said conical projecting portion is a right frustrum.

4. The tool as defined in claim 1 in which the serrations of said surfaces are formed by a plurality of V-shaped grooves.

5. The tool as defined in claim 1 in which said intersection of said surfaces forms an acute angle whose bisector is parallel with said central axis.

6. The tool as defined in claim 1 wherein: said body has three extending arms;
    first deburring means disposed at the extremity of a first of said arms;
    second deburring means disposed at the extremity of a second of said arms; and
    third deburring means disposed at the extremity of a third of said arms;
    wherein only one of said first, second, and third deburring means is usable at a time with the unused two of said deburring means and associated ones of said arms serving as a handle for manual operation of active one of said deburring means and wherein the length of each of said arms is selected such that any two of said arms serving as a handle can be safely grasped without the hand contacting either of the inactive deburring means.

7. The hand tool as defined in claim 6 in which:
    each of said arms is a right cylinder;
    each of said first, second, and third deburring means having an essentially conical projection with a central axis coincident with the axis of said cylinder; and
    a circular rim surrounding the base of said conical projection and symmetrically disposed about said central axis, the exterior conical surface of said projection and the interior surface of said rim diverging with respect to the intersection of said surfaces, said intersection forming a circle having a diameter essentially equal to the mean diameter of a designated size conduit to be deburred, said surfaces forming a conduit-end contacting area, said surfaces being serrated;
    whereby said conical projection serves to guide the end of a conduit into and to safely maintain contact with said contacting area and whereby relative rotation of said area with respect to a conduit end in contact with said area causes the inner and outer edges thereof to be concurrently deburred.

* * * * *